Patented Jan. 24, 1950

2,495,215

UNITED STATES PATENT OFFICE 2,495,215

METHOD OF PRODUCTION OF ALKALI ARSENITE, PHENOLS, AND ALKALI PHENOLATES

George Lieberman, Houston, Tex.

No Drawing. Application June 16, 1947,
Serial No. 755,024

12 Claims. (Cl. 23—53)

1

The invention relates to a method of producing alkali arsenites and phenols from alkali phenolates solutions.

In the cracking of hydrocarbons in present day refining practice, it is customary to wash the cracked hydrocarbons with an alkali solution, such as sodium hydroxide, potassium hydroxide or the like. This alkali solution serves to remove any sulphur compounds that may be present in the cracked hydrocarbons as impurities. Also it will combine with any phenols present therein to form alkali phenolates.

Heretofore this spent refinery caustic solution of sulphur compounds and alkali phenolates, have been, in a good many cases, waste products from the refinery.

It is well known that to recover phenols from this alkali phenolates solution, an acid such as sulfuric, may be mixed therewith, freeing the phenols from the alkali solution, and forming a salt of the acid which would be $Na_2SO_4$ if $H_2SO_4$ were used as the liberating acid. The most common practice, however, used to recover these phenols from the alkali phenolates solution, has been to bubble or otherwise mix carbon-dioxide gas with the phenolates solution whereby the phenols are freed and the carbon dioxide forms an alkali carbonate. This alkali carbonate obtained from this process is relatively impure and not marketable in such state.

An object, therefore, of the present invention is to provide a method for producing free phenols from a refinery alkali phenolates solution and to produce a relatively pure alkali arsenite.

Another object of the invention is to produce alkali arsenite from any suitable source of alkali phenolates solution.

Another object of the invention is to provide a method of producing free phenols from an alkali phenolates solution.

Another object of the invention is to provide a method of producing an alkali arsenite in a relatively pure state, whereby it may be used commercially without further purification.

A further object of the invention is to provide a method for producing from an alkali phenolates solution, relatively pure alkali arsenite and alkali phenolates.

A still further object of the invention is to provide a process for producing alkali salts of elements such as arsenic, antimony, bismuth and phosphorous.

Other and further objects of the invention will become more fully apparent with a consideration of the following description.

2

I have found that by adding arsenous oxide in a sufficient quantity to a solution of alkali phenolates, pure or impure, with or without excess alkali, the phenols will be liberated from such solution, the amount of phenols liberated being dependent upon the quantity of oxide added up to a certain point. The mixture of alkali phenolates, alkali and the added arsenous oxide when heated to a temperature sufficient, cause the arsenous oxide to react with alkali or alkali salts present and with the alkali phenolates. As a practical matter the temperature range necessary for the reaction has been found to be approximately 140° to 200° F. The arsenous oxide will combine with the alkali salts present in the solution, and also with the alkali atom in the alkali phenolates compounds to form an alkali arsenite, and thereby liberate the phenols. While it is sometimes necessary to heat the solution to react the arsenous oxide therewith, it seems obvious that if a fresh solution of alkali is added to the phenolates solution, the exothermic heat given off by the fresh alkali solution will be enough to react the arsenous oxide with the resulting mixture.

As for example, if the alkali phenolates solution is composed of such compounds, such as sodium phenolates and higher phenol homologues, arsenous oxide may be added thereto in a sufficient quantity calculated so that it will combine with the sodium phenolates and any excess alkali so that the phenols will be liberated from the alkali atom. Also, sodium arsenite will be formed by the arsenous oxide combining with the liberated sodium atom. It seems obvious, of course, that if the solution of alkali phenolates is composed of potassium phenolates or ammonium phenolates, substantially the same equivalent reaction will occur when arsenous oxide is added thereto. In this instance, of course, the alkali arsenite corresponding to the alkali present in the original phenolates solution will be formed. That is to say, if the original alkali phenolates are composed of potassium phenolate and enough arsenous oxide is added thereto, to react with all of the alkali and the alkali phenolates in the solution, the phenols will be liberated and in turn, potassium arsenite will be produced. Similarly, if ammonia is the alkali present in the original solution, then when the arsenous oxide is added thereto so as to liberate the free phenols, ammonium arsenite will be formed.

It seems obvious that in accordance with the formula

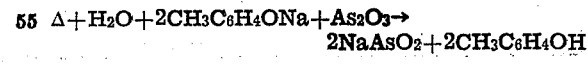

any amount of arsenous oxide may be added to the alkali phenolates solution, which in the above example is the sodium salt of cresylic acid, depending upon whether it is desired to free all phenols from the alkali phenolates solution or whether it is desirable to retain a portion of the original solution, as is, in the form of alkali phenolates, along with the quantity of sodium arsenite that has been formed due to the addition of the certain amount of the arsenous oxide.

The strength of the alkali phenolates solution may be determined by any standard method such as titration or the like, whereby the amount of arsenous oxide can be determined that will be necessary it is desired to react enough of the oxide with the solution to free all phenols. That is to say, if for example, we had a solution of sodium phenolates consisting of a 25% solution of sodium cresylate solution based on 100 pounds of solution, the equivalent weight thereof could be readily determined by those skilled in the art. In turn, the weight of arsenous oxide needed to combine with this weight of alkali phenolates could be determined if it is desired that the reaction go to completion, to form free phenols and alkali arsenite. The following example is given as being illustrative of the amount of arsenous oxide to be used in order to form cresylic acid and sodium arsenite from a solution which is in accordance with the above mentioned example.

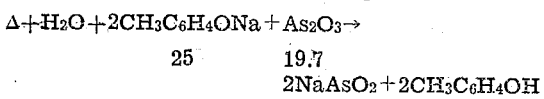

$$\Delta + H_2O + 2CH_3C_6H_4ONa + As_2O_3 \rightarrow$$
$$25 \quad 19.7$$
$$2NaAsO_2 + 2CH_3C_6H_4OH$$

From the foregoing example we can see that to free all phenols from the alkali phenolates solution in the foregoing example, it would be necessary to add 19.7 pounds of arsenous oxide.

Where there is an excess of alkali present in the alkali phenolates solution, the amount of arsenous oxide necessary to complete the reaction so that all the phenols therein are liberated will, of course, be greater than when there is no excess alkali. The following example illustrates an alkali phenolates solution which is composed of sodium cresylate and an excess of alkali. It will be assumed that in a hundred pounds of solution, there is present 25% sodium cresylate and 10% excess alkali. The formulas for this reaction are as follows with the calculated amount of arsenous oxide necessary (1) to react with the salt of the phenolates and (2) the excess alkali in order to produce free phenols and sodium arsenite.

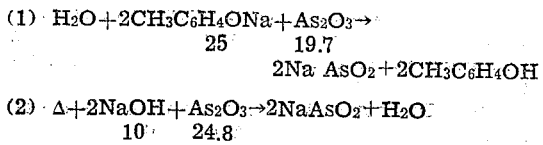

(1) $H_2O + 2CH_3C_6H_4ONa + As_2O_3 \rightarrow$
$\quad\quad 25 \quad\quad 19.7$
$\quad\quad 2Na\ AsO_2 + 2CH_3C_6H_4OH$ (2) $\Delta + 2NaOH + As_2O_3 \rightarrow 2NaAsO_2 + H_2O$
$\quad\quad 10 \quad\quad 24.8$ Whether or not the reaction will be carried to completion will be determined upon exactly what commercial use to which the product is to be put. If, for example, it is desired that a product is to be made which contains characteristics suitable for a cattle dip solution, then it would be desirable that the reaction between the alkali phenolates solution containing excess alkali and between arsenous oxide, not be carried to completion. That is to say, enough arsenous oxide would be added to react with any excess alkali present in the alkali phenolates solution to form alkali arsenite and leave some of the alkali phenolates as they were in the original solution, since in a cattle dip solution it is desirable that both an alkali arsenite and an alkali phenolate be present as constituents of the cattle dip.

To produce relatively pure free phenols from the alkali phenolates solution, then, of course, an amount of arsenous oxide would be added so as to react with all alkali and all alkali salts present in the original solution so that an alkali arsenite is formed, thereby freeing the phenols. The sodium arsenite obtained by this method is relatively pure and is usable, as is, commercially for many purposes, such as in the manufacture of fungicides, insecticides, germicides, preservatives, herbicides and larvacides and other uses.

If sulphur compounds are present in the original solution or, if they are present in the phenolates solution and the alkali arsenite, after the reaction has been effected, it may be desirable to remove such sulphur compounds from either the phenolates or the alkali arsenite, or both, or at least render such sulphur compounds innocuous.

This procedure of removing sulphur compounds or rendering them innocuous is well known in the art and the method used to remove such compounds will depend partially upon the type of sulphur compounds present.

Various methods may be used, such as steaming the solution prior to or after the aforementioned reaction. Air may be blown through the original solution or it may be blown through the final phenolates solution to displace the volatile sulphur compounds therefrom, chlorine compounds or chlorine may be used to form compounds with the sulphur or to oxidize the sulphur impurities present in the solution.

The foregoing examples are given only to illustrate the invention. It seems obvious that any strength alkali phenolates solution could be used in practising the invention, and any amount, up to the equivalent amount, of arsenous oxide could be added thereto depending upon whether it is desired that all phenols be liberated, or whether only a portion be liberated.

While the foregoing invention has been described in connection with solutions from refineries, it seems obvious that it works as well on similar phenolates solutions obtained from coal tar distillates as well as phenolates solution obtained from the synthetic manufacture of phenols.

Broadly the invention contemplates a method producing alkali arsenites and phenols from an alkali phenolates solution.

What is claimed is:

1. A method of recovering phenols from a mixture comprising alkali phenolates, alkali, and alkali salts, the steps of adding arsenous oxide in an amount to react with the alkali, alkali salts, and alkali phenolates in the mixture and elevating the temperature of the resulting mixture to react the arsenous oxide with the alkali phenolates, alkali and alkali salts to liberate the phenols from the alkali phenolates.

2. A method of producing an alkali arsenite from a mixture comprising alkali phenolates and alkali, including the steps of adding arsenous oxide in an amount to react with the alkali and alkali phenolates in the mixture, and elevating the temperature of the resulting mixture to react the arsenous oxide with the alkali phenolates and alkali to form said alkali arsenite.

3. A method of producing an alkali arsenite and recovering phenols from a mixture containing alkali phenolates comprising the steps of, adding arsenous oxide to the mixture in an amount to react with the alkali phenolates and elevating the temperature of the mixed arsenous oxide and alkali phenolates to liberate the phenols from the alkali phenolates and to react the alkali phenolates with the arsenous oxide to form an alkali arsenite.

4. A method of producing sodium arsenite from a mixture containing sodium phenolates comprising the steps of, adding arsenous oxide to the mixture in an amount to react with the sodium phenolate in the mixture, and elevating the temperature of the resulting mixture to react the arsenous oxide with the sodium phenolate to form sodium arsenite.

5. A method of liberating phenols from sodium phenolates comprising the steps of mixing arsenous oxide with the sodium phenolates, and elevating the temperature of the resulting mixture to react the sodium phenolates and arsenous oxide to liberate the phenols from the sodium phenolates.

6. A method of producing sodium arsenite from a solution containing sodium phenolates comprising the steps of, adding arsenous oxide to the solution in an amount to react with the sodium phenolate in the solution, and elevating the temperature of the resulting solution to react the arsenous oxide with the sodium phenolate to form sodium arsenite.

7. The process of recovering phenols from spent refinery caustic comprising the step of adding a quantity of arsenous oxide to the caustic solution in an amount to liberate the phenols from such solution.

8. In the method of producing sodium arsenite from spent refinery caustic comprising the step of adding a quantity of arsenous oxide to the caustic solution in an amount to react with the caustic solution to form sodium arsenite.

9. The method of producing an alkali arsenite from a spent refinery caustic solution including alkali phenolates comprising the step of adding arsenous oxide in an amount to react with the alkali phenolates to form an alkali arsenite.

10. The process of recovering phenols from a solution including alkali phenolates, the step of adding a quantity of arsenous oxide to the solution in an amount to liberate the phenols therefrom.

11. A method of producing an alkali arsenite and recovering phenols from a mixture containing alkali phenolates and sulphur impurities comprising the steps of, removing the sulphur impurities, adding arsenous oxide to the mixture in an amount to react with the alkali phenolates and elevating the temperature of the mixed arsenous oxide and alkali phenolates to liberate the phenols from the alkali phenolates and to react the alkali phenolates with the arsenous oxide to form an alkali arsenite.

12. A method of producing an alkali arsenite and recovering phenols from a mixture containing alkali phenolates and sulphur impurities comprising the steps of, adding arsenous oxide to the mixture in an amount to react with the alkali phenolates and elevating the temperature of the mixed arsenous oxide and alkali phenolates to liberate the phenols from the alkali phenolates and to react the alkali phenolates with the arsenous oxide to form an alkali arsenite and removing the sulphur impurities from the liberated phenols and alkali arsenite.

GEORGE LIEBERMAN.

REFERENCES CITED

The following references are of record in the file of this patent:

UNITED STATES PATENTS

| Number | Name | Date |
| --- | --- | --- |
| 2,172,415 | Stewart | Sept. 12, 1939 |
| 2,331,034 | Lazar | Oct. 5, 1943 |
| 2,367,172 | Malson | Jan. 9, 1945 |

OTHER REFERENCES

Mellor Comprehensive Treatise on Inorganic and Theoretical Chemistry, vol. 9, published by Longmans, Green & Co., N. Y. (1929), pages 97 and 119.